(12) United States Patent
Leduc et al.

(10) Patent No.: US 6,840,007 B2
(45) Date of Patent: Jan. 11, 2005

(54) ROTARY PLANT GROWING APPARATUS

(76) Inventors: Michel Leduc, 656 Route 201, St-Clet, Quebec (CA), J0P 1S0; Claude Poirier, 792 rue Chicoine, Condo 103, Vaudreuil-Dorion, Quebec (CA), J7V 8S9

( * ) Notice: Subject to any disclaimer, the term of this patent is extended or adjusted under 35 U.S.C. 154(b) by 0 days.

(21) Appl. No.: 10/375,681

(22) Filed: Feb. 28, 2003

(65) Prior Publication Data

US 2004/0060491 A1 Apr. 1, 2004

(51) Int. Cl.[7] .............................................. A01G 9/02
(52) U.S. Cl. .................... 47/62 C; 47/62 N; 47/66.5; 47/79; 47/48.5
(58) Field of Search .......................... 47/1.01 R, 59–64, 47/65.5, 66.1–67, 79–83, 85, 86, 44–48.5, 58.1, 901, 904, DIG. 6; 111/118, 128, 200, 900, 905, 925, 915–919

(56) References Cited

U.S. PATENT DOCUMENTS

| | | |
|---|---|---|
| 2,358,000 A | 9/1944 | Cornell |
| 3,365,840 A | 1/1968 | Cooper |
| 3,432,965 A | 3/1969 | Smith et al. |
| 3,667,157 A | 6/1972 | Longhini |
| 3,882,634 A | 5/1975 | Dedolph |
| 4,021,964 A | 5/1977 | Darwin et al. |
| 4,028,847 A | 6/1977 | Davis et al. |
| 4,211,034 A | 7/1980 | Piesner |
| 4,255,896 A | 3/1981 | Carl |
| 4,379,375 A | 4/1983 | Eisenberg et al. |
| 4,908,985 A | 3/1990 | Dowell |
| 5,010,686 A | 4/1991 | Rivest |
| 5,515,648 A | 5/1996 | Sparkes |
| 5,862,628 A | 1/1999 | Takashima |
| 6,219,966 B1 | 4/2001 | Lapointe et al. |

FOREIGN PATENT DOCUMENTS

CA 2343254 7/2001

Primary Examiner—Christopher J. Novosad

(57) ABSTRACT

A rotary growing apparatus comprises a cylindrical structure or drum provided with a series of parallel elongated, longitudinally extending, baskets adapted to receive therein the plants to be grown. A support base is provided for the drum, and a drive mechanism is adapted to rotate the drum on the support base about a rotational axis of the drum. At least one light source extends inside the drum about which the drum and the plants carried thereby can rotate. A feeding system provides nutrient fluid to the growing plants as the drum rotates and the baskets contact the nutrient fluid. The elongated baskets each include a bottom wall and a pair of side walls and are capable of receiving therein a series of plants supported by a growing medium. The elongated baskets define in the bottom and side walls thereof a plurality of apertures for allowing the nutrient fluid to access the plants. The elongated baskets are removably attached to a pair of parallel and opposed rims of the drum.

17 Claims, 15 Drawing Sheets

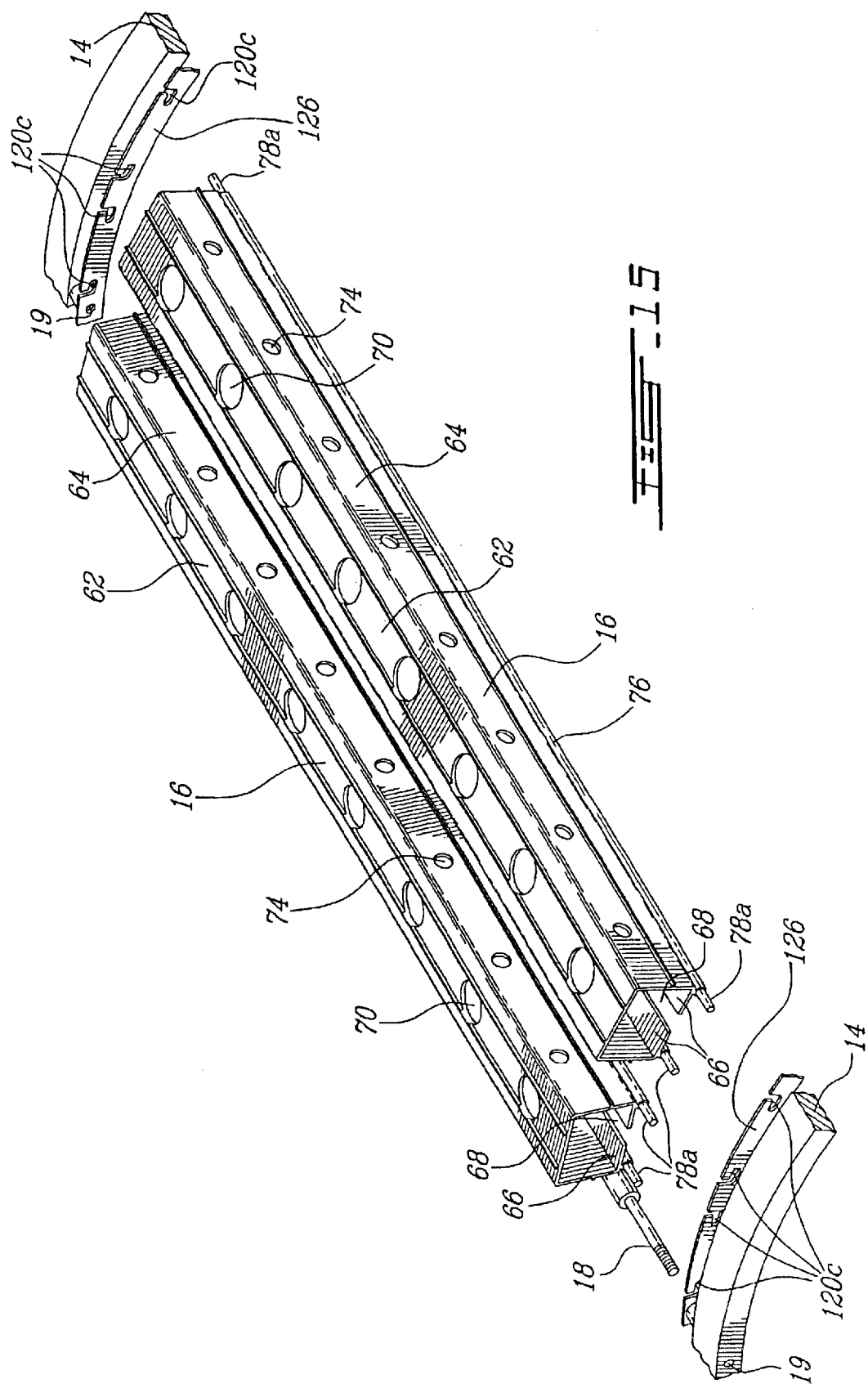

ROTARY PLANT GROWING APPARATUS

BACKGROUND OF THE INVENTION

1. Field of the Invention

The present invention pertains to a plant growing apparatus of a type where the apparatus for growing plants includes a cylindrical drum-like structure that is supported by a base over a water nutrient supply system and that rotates about a light source.

2. Description of the Prior Art

In systems where plants were previously grown predominantly in a flat bed under a lamp or series of lamps, the plants would be at variant distances from the lamp(s). Canadian Patent 2,343,254 issued on Mar. 2, 2002 discloses a system where the plant apparatus is in the form of a drum which rotates about a light source, thus maintaining a constant distance between the plants and the lamp. The circumferential surface of the drum is made of assembled segments that define a series of holes to receive plant pots. The drive means described in the preferred embodiment comprises a belt which engages grooves in both the drum supporting wheels and a similar groove on one of the opposite sides of the drum in alignment with said supporting wheels and the drum is thus driven and rotated by such belt activated by an electric motor. The water-feeding basin is located under a rigid unitary base that supports the drum and cannot be removed while the apparatus is in use.

The drum and pot holes structure of Canadian Patent 2,343,254 presents a number of inconveniences. In operation, the drum cannot be taken apart or have one or more of its segments, which are bolted together, removed to insert and fix the pots in the holes. The length of the drum is limited to about 40 inches so that a person can reach the middle of the drum to insert the plant pots in the corresponding holes or similarly to provide maintenance in removing weeds or other similar undesirable objects. Another disadvantage resides in the actuation of the drum by the use of a belt which under long use and wear will stretch, thereby causing loss of frictional engagement and improper operation, and thus slowing or stopping the drum rotation which interrupts the regular feeding of water and nutrient over the circumference of the drum. A further disadvantage results from the lights being fixed or stationary at a predetermined location in the translucent plastic tube, whereby certain zones adjacent the extremity of the light beam within the drum will not receive the same amount of light as other sections. In conjunction with the light, the use of a plastic tube is also a source of a problem because in the absence of a sensor or if deficiency, occurs in the sensor or if the ventilation system fails, the plastic tube may overheat and lose its original form and its performance or lifetime would then decrease, As it is apparent from these disadvantages, they may cause undesirable interruption, improper, more costly and inconvenient manpower operations.

Notwithstanding the introduction of this rotary plant growing apparatus in Canadian Patent 2,343,254, the structure described therein does not fulfil the concept, or intent of the improvements of the present invention.

SUMMARY OF THE INVENTION

It is therefore an aim of the present invention to provide an improved rotary growing apparatus.

Therefore, in accordance with the present invention, there is provided a rotary growing apparatus comprising: a cylindrical structure; a support base for said cylindrical structure; drive means to rotate said cylindrical structure on said support base about a rotational axis of said cylindrical structure; at least one light source inside said cylindrical structure about which said cylindrical structure can rotate; means for providing nutrient fluid to growing plants as said cylindrical structure rotates; the improvement consisting in said cylindrical structure comprising at least one elongated basket including a bottom wall and a pair of side walls and being capable of receiving therein a series of plants supported by a growing medium, said elongated basket defining in at least one of said bottom and side walls thereof a plurality of apertures for allowing the nutrient fluid to access the plants.

The rotary growing apparatus has a cylindrical structure that rotates horizontally on a support frame and lamp post, which structure rotates horizontally about an axially positioned lamp. The improvement resides in the shape and use of elongated basket or baskets that are adapted to receive plants therein and that are, in a preferred embodiment, removable from the cylindrical structure for easier insertion of plants inside the basket and ease of maintenance. Also provided is an improved lighting system that includes at least two lights that provide substantially uniform lighting across substantially the entire interior surface of the cylindrical structure. An improved water feeding mechanism and structure is provided, whereby when necessary, exposure of the plants to the immersion in the nutrient tank is interrupted. Finally, an improved drum driving mechanism is provided to cause the rotation of the drum.

A further advantage or improvement resides in the double frame of the support stand, whereby through pivotal connection, one is capable of elevating the cylindrical structure upwardly thus allowing possible removal and insertion of the water tank underneath while the cylindrical structure is in operation, i.e. rotating.

BRIEF DESCRIPTION OF THE DRAWINGS

Having thus generally described the nature of the invention, reference will now be made to the accompanying drawings, showing by way of illustration a preferred embodiment thereof, and in which;

FIGS. 5 to 15 are exploded perspective views of part of a number of drum variants for the rotary plant growing apparatus, in accordance with the invention.

DESCRIPTION OF THE PREFERRED EMBODIMENTS

Figure 1:
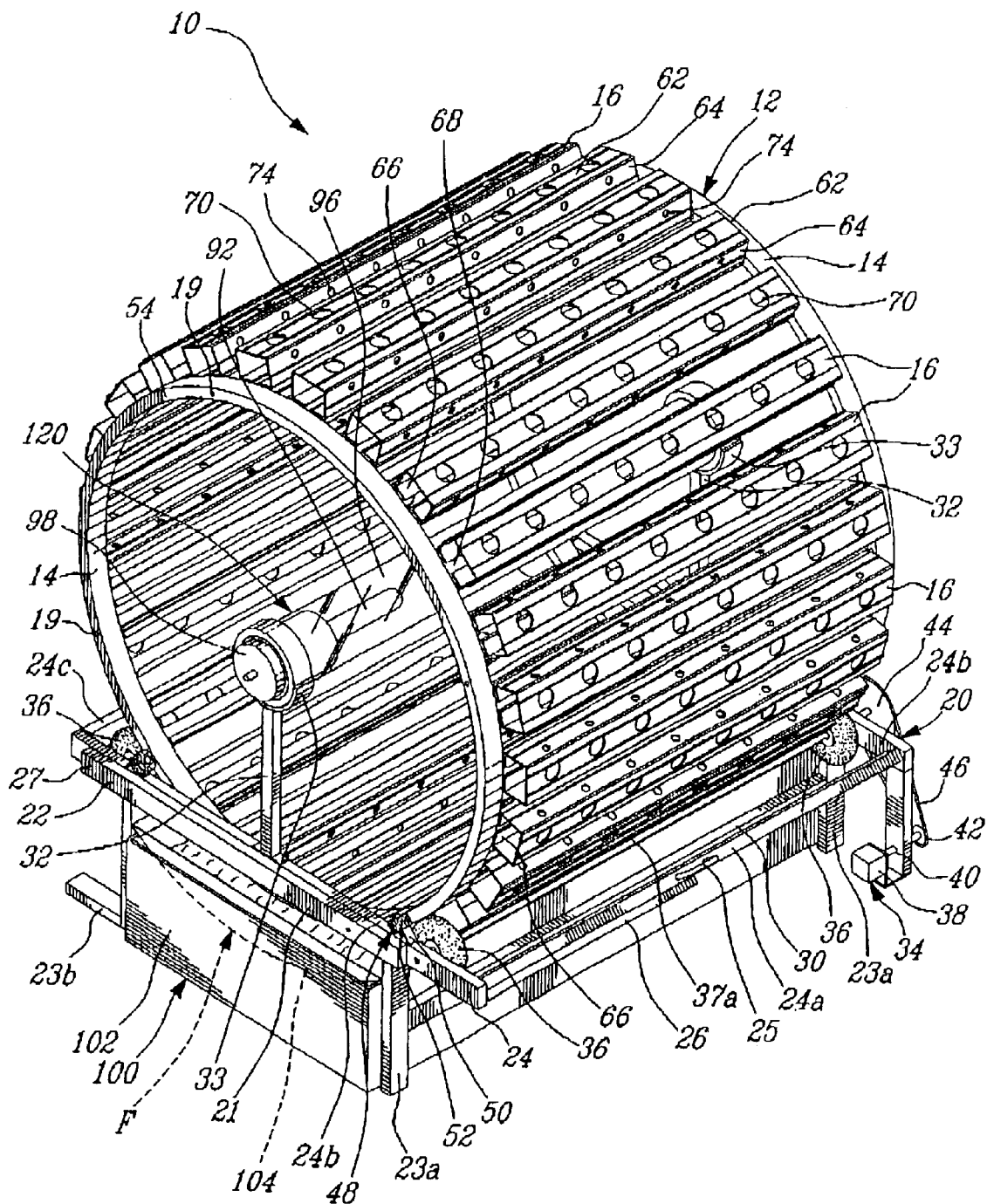
FIG. 1 is a perspective view of a rotary plant growing apparatus in accordance with the invention.
Figure 2:
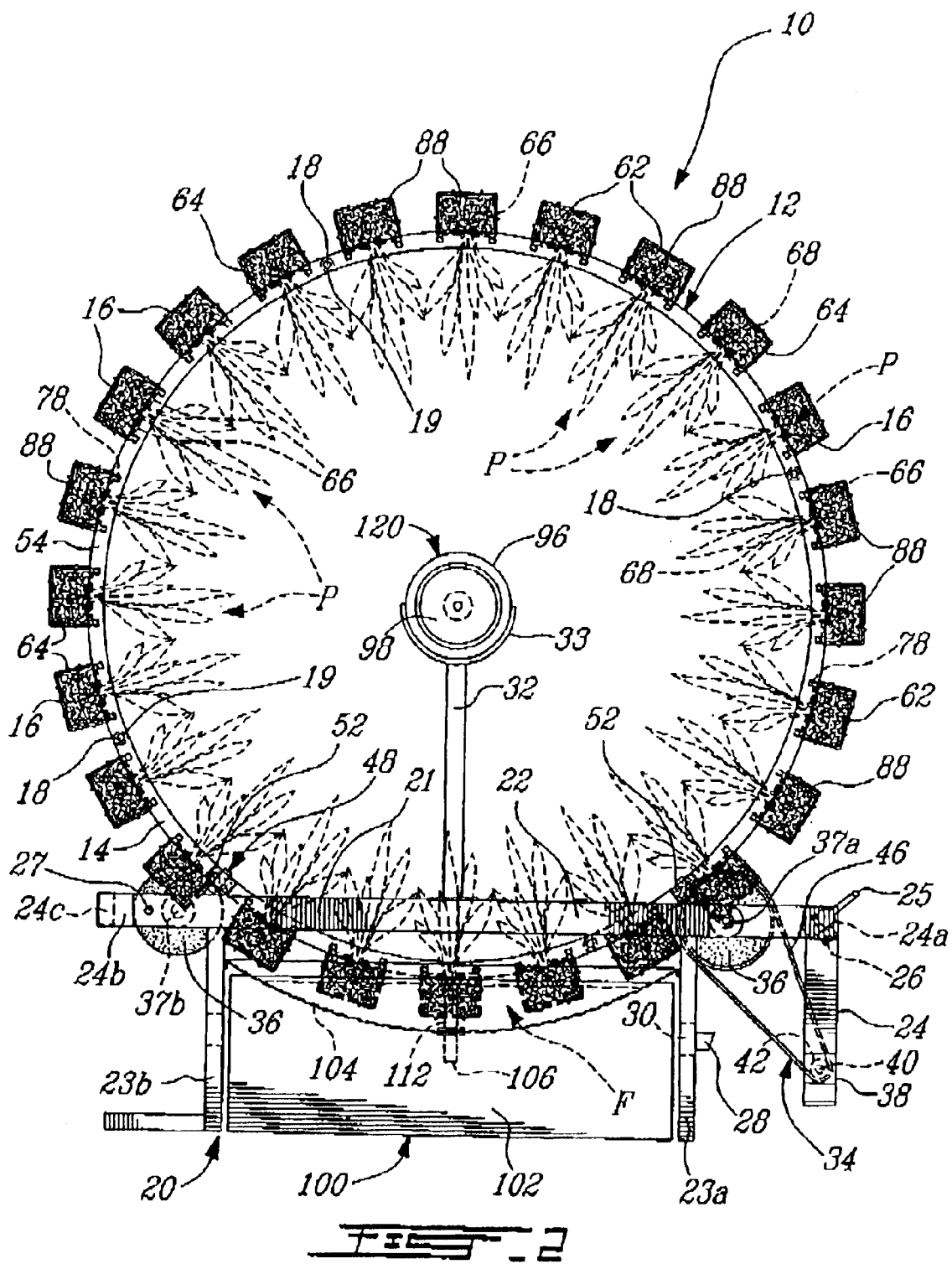
FIG. 2 is a side view of the rotary plant growing apparatus of FIG. 1, but herein shown with plants installed therein.

Referring mainly to FIGS. 1 and 2, a plant growing apparatus 10 in accordance with the present invention includes an open-ended cylindrical structure 12, hereinafter referred to as the drum 12. The drum 12 is made of two spaced apart annular members or rims 14, connected by rods 18 fixedly engaged in openings 19 (see FIG. 3) defined in the inside surfaces of the rims 14, and of a series of parallel cross members or elongated baskets 16 that extend between, and are mounted to, the rims 14. More particularly, the rims 14 are vertically oriented and parallel to each other, with the baskets 16 extending horizontally therebetween and parallelly to a longitudinal or rotational axis of the drum 12 and along the entire circumference of the drum 12. The baskets 16 are removably attached to the annular rims 14 by appropriate means, such as screws and bolts, although quick release attachment mechanisms are preferred, as described in more detail hereinbelow.

The drum 12 is mounted on a support stand 20. The stand 20 comprises a stationary base frame 22 consisting of a pair of elevated horizontal elongated side members 21 each fixedly mounted at upper ends of a pair of legs 23a and 23b that are spaced from each other such as to allow the lateral insertion, and removal, of a watering station 100 along the axis of the apparatus 10, with the side members 21 extending above the watering station 100. The base frame 22 may be set with four casters (not shown) underneath its legs 23a and 23b which will allow movement of the apparatus 10 on the floor.

Figure 4:
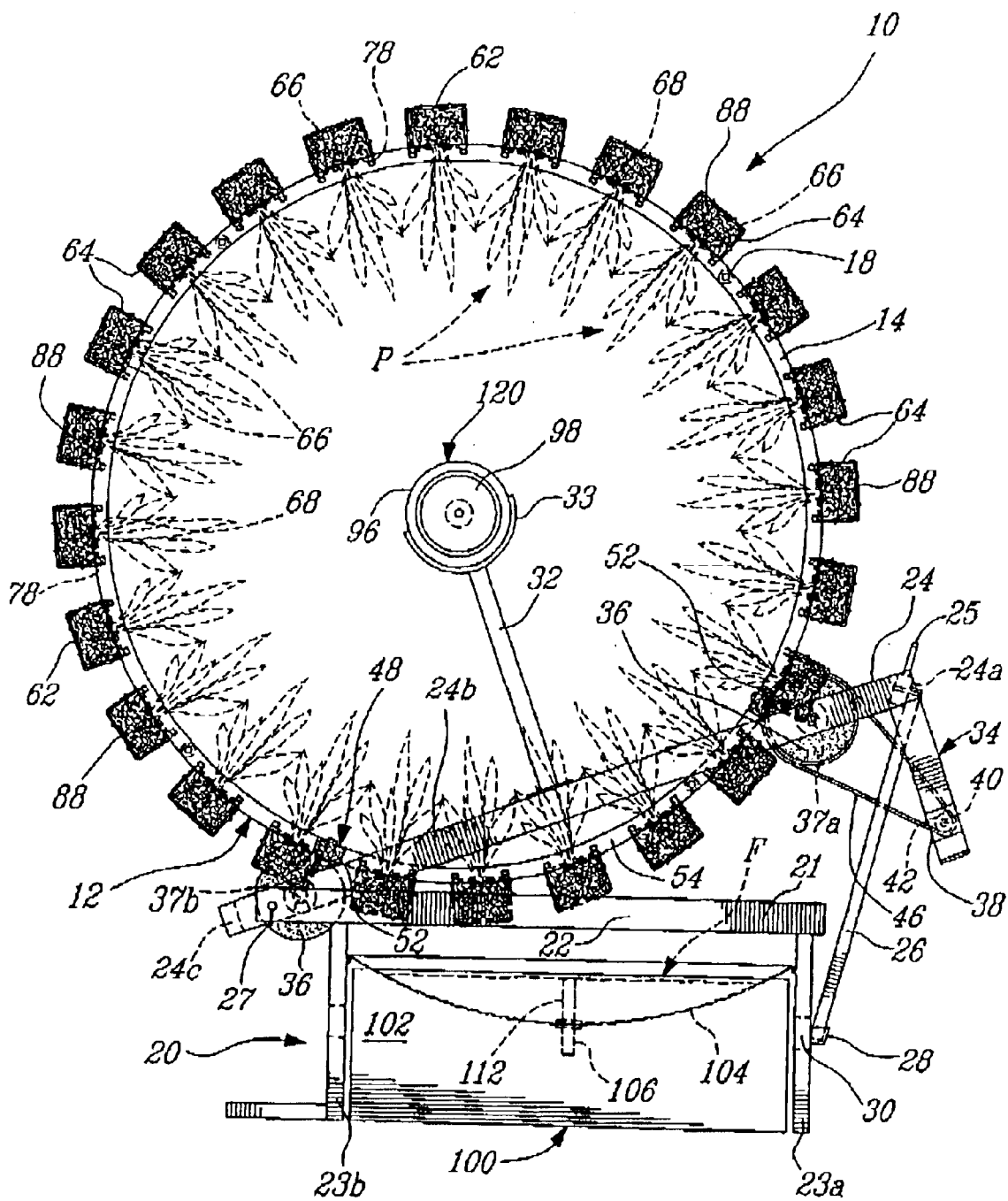
FIG. 4 is a side view of the rotary plant growing apparatus that is similar to FIG. 2, but that illustrates the rotary plant growing apparatus in an alternate position.

A rectangular moveable frame 24 is pivotally mounted at an upper end of the base frame 22. The moveable frame 24 includes a front member 24a, a pair of side members 24b and a rear member 24c. The front member 24a is provided with a handle 25. The moveable frame 24 is pivotally connected at a rear end thereof (i.e. opposed to the handle 25) to the side members 21 of the base frame 22 via a pair of pivot pins 27 (or suitable hinges) extending through the side members 21 of the base frame 22 and the side members 24c of the moveable frame 24, The front end of the moveable frame 24 is supported by the upper ends of the legs 23a, whereby the moveable frame 24 extends horizontally when at rest (see FIGS. 1 and 2), whereas the moveable frame 24 can be pivotally lifted by handle 25 to an elevated position, as seen in FIG. 4. The moveable frame 24 also includes a connecting or holding member in the form of a bar 26 that normally extends horizontally along the front member 24a of the moveable frame 24, i.e. behind the handle 25, but that can, when the moveable frame 24 has been raised as in FIG. 4, be pivoted downwardly so as to extend in a vertical plane and be engaged at a lower end thereof in a socket 28 that is fixedly mounted to a front cross member 30 of the base frame 22 that links front legs 23a and 23b. The bar 26 is of a length such that, when engaged in the socket 26, it maintains the drum 12 in an elevated position, In such an elevated position, the lowermost elongated baskets 16 mounted on the drum 12 are now above the upper part of the watering station 100 thus allowing the watering station 100 to be slid out of, or in, the base frame 22.

The moveable frame 24 is slightly narrower than the base frame 22, along the longitudinal axis of the drum 12, so as to fit within the side members 21, but is of a larger size than the base frame 22 in the other direction so as to receive therein the drum 12 with the elongated baskets 16 mounted thereon. The moveable frame 24 also includes tour vertical wheels 36 that support the drum 12. The support wheels 36 are rotatably mounted to the inside of the front and rear ends of each of the side members 24b of the moveable frame 24 and are connected in pairs by front and rear axles 37a and 37b, respectively. The wheels 36 are aligned with the rims 14 of the drum 12 so that the rims 14 sit thereon, under gravity forces, in such a manner that a segment of the drum 12 extends below the horizontal plane of the moveable frame 24, as best seen in FIG. 1, thus allowing the elongated baskets 16 to become partially immersed in the watering station 100 underneath.

The moveable frame 24 also include a pair of vertical lamp support posts 32 that extend upwardly from middle portions of the side members 24b and in a vertical plane extending through the rotational axis of the drum 12. Each post 32 terminates with a segmented circular (arcuate) member 33 capable of receiving a lighting system 120, which will be described in more details hereinafter.

A driving mechanism 34 provided for rotating the drum 12 is mounted at a front part of the moveable frame 24 and is adapted to drive the front axle 37a and thus the two front wheels mounted to the front axle 37a such that these front wheels 36 rotatably drive via frictional engagement the rims 14 and thus the drum 12, with the rear wheels 36 being idler, i.e. passive, wheels. As seen in FIG. 1, the drive mechanism 34 includes a motor 38, a motor drive shaft 40, a small sprocket wheel 42 fixed at the free end of the shaft 39, a large sprocket wheel 44 fixed to the front axle 37a, outwardly of the wheel 36, and a chain 46 engaged around the small and large sprocket wheels 42 and 44. Therefore, rotation of the motor 38 causes a rotation of the shaft 40 which itself rotates the small sprocket wheel 42, with the small sprocket wheel 42 driving the chain 46, which itself causes the large sprocket wheel 44 to rotate, thereby rotatably driving the front axle 37a and the front wheels 36 mounted thereto, which finally causes the rotation of the drum 12. The small and large sprocket wheels 42 and 46 and the chain 46 could, for instance, be replaced by a pair of pulleys and a belt. The drive mechanism 34 may incorporate a pressure transmission mechanism (not shown).

In order to prevent any longitudinal displacement of the drum 12, i.e. translationally along its axis of rotation, four abutments 48 are provided, that is two for each side member 24a of the moveable frame 24, Each abutment 48 includes an angled support 50 fixedly a secured to a respective side member 24b, and an idler guide wheel 52 that is rotatably mounted to the angled support 50. The guide wheels 52 are positioned so as to outwardly contact outside surfaces 54 of the rims 14, such that the rotation of the drum 12 causes the guide wheels 52 to rotate. Alternatively to the abutments 48, an annular vertical flange (not shown) could be provided outwardly of, and parallel to, each wheel 36 and of greater diameter than the wheel 36, for keeping the drum 12 longitudinally in place while it sits of the support wheels 36.

Figure 3:
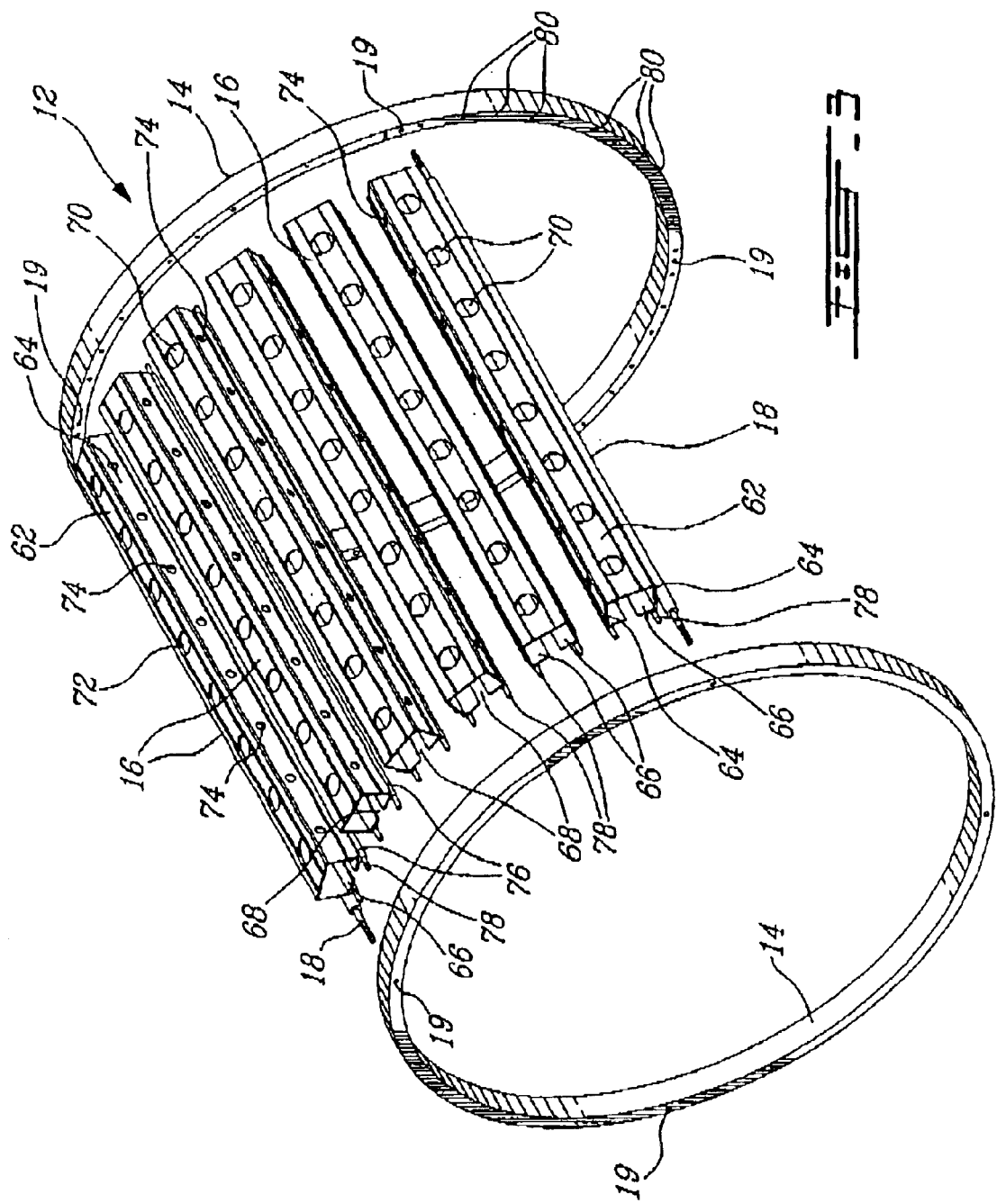
FIG. 3 is an exploded perspective view of part of a drum of the rotary plant growing apparatus.

As best shown in FIG. 3, each elongated basket 16 is preferably C-channel shaped in including a bottom wall or web 62, two (2) side walls 64, and a pair of horizontal upper walls 66 extending towards each other from ends of the side walls 64 that are opposite to the ends thereof that connect with the web 62. There is gap 68 that is defined between facing free edges of the upper walls 66 to allow plants P (see FIG. 2) to extend between the upper walls 66 and through the baskets, A series of holes 70 are defined in the bottom walls 62 of the baskets 16, and a series of side holes 74 are defined in the lower portions of the side walls 64 so that when the drum 12 and thus the baskets are rotated, nutrient fluid F in the watering station 100 can penetrate through the walls of the baskets 16 and seep therein to water and feed the plants P while allowing excess nutrient fluid F to drain therefrom.

There are also provided an attachment system to attach and retain the respective ends of the elongated baskets 16 to the rims 14 of the drum 12. A preferred mode of attachment includes hollow tubular members 76 that are fixed longitudinally on the outside of the baskets 16 and, more particularly, there are two such tubular members 76 for each basket 16, which extend the length of the basket 16 and which herein are provided adjacent the corners where the upper walls 66 join with the side walls 64. A resilient attachment pin 78 is secured to each end of each tubular member 76 and extends axially outwardly therefrom. The attachment pins 78 are adapted to fit into respective holes 80 defined on the inside walls of each of the rims 14 in such a way that the elongated baskets 16 can be mounted between the rims 14 by inserting the resilient pins 78 in the holes 80, with the baskets being perpendicular to the rims 14.

While the attachment system can be thus made, it is not necessary that each of the four pins 78 of each basket 16 be resilient, as only a pair of pins 78 at one end of a basket 16 needs to be resilient.

The elongated basket 16 can be inserted and attached to the drum 12 by first inserting at one end of the basket 16, the two pins 78 fixed thereat into the corresponding pair of holes 80 in the side wall of one of the rims 14 and then, while retaining the two other opposite resilient biased pins 78 inside the tubular section 76 inserting these resilient pins 78 into the opposite pair of holes 80 in the other rim 14.

Alternate or other ways of attaching the elongated baskets 16 to the rim 14 can be used. For instance, in one such mode, the four pins 78 are not resiliently biased, and are fixedly attached to the ends of the elongated basket 16, with the inside walls of each rim defining a pair of L-shaped slots (not shown) that are open at the outside periphery of the side walls of the rim to define an entrance so that a pair of pins of the elongated basket can be inserted in the slot from this entrance such as to be first inwardly slid along a radially extending section of the slot before being slid in a tangential section thereof, at the end of which (that is at the closed end of the slot opposite the entrance thereof) the pin would snugly fit in the slot and be retained therein. This attachment system is basically of the bayonet type. In order to prevent the baskets 16 from vibrating and sliding out of these L-shaped slots during operation and use of the apparatus, and more particularly when the baskets rotate and are in an inverted position or upside down, a retaining annular band or belt (not shown) is engaged around and outside the periphery of each of the rim 14 such as to cover the entrances of the slots, whereby all of the elongated baskets remain attached to the rims 14. Another alternative (not shown) would have notches defined on the periphery of the rims 14, in which would nest outwardly extending pins of the baskets (similar to pins 78 but rigid) such as to be substantially flush with the outer peripheral surfaces of the rims 14, with an annular retaining band or belt (not shown) being engaged around and outside these outer peripheral surfaces of the rims 14 thereby covering the notches and the pins lodged therein and thus preventing the baskets from coming out of the notches during operation and use of the apparatus. Other means such as the use of individual clips at each location or similar retention means can be used, Each plant P is inserted in a block of moss 88 (or other medium suitable for growing plants, e.g. glass beads) which is of substantially square or round area, with side dimensions or with a diameter corresponding substantially to the inside width of the basket 16 (i.e. to the distance between the side walls 64 thereof), so that the blocks of moss 88 can snugly fit into the elongated baskets 16. Therefore, all of these insertion operations can optionally take place on a table or work bench while the elongated baskets 16 are dismounted from the rotating apparatus and, more particularly, from the drum 12 thereof.

In the case where the elongated baskets 16 are of rigid material, the blocks of moss 88 are inserted at one end of the basket 16, with the plants P that extend from the blocks of moss 88 being slid along the gap 68 defined between the upper walls 66 and into the blocks of moss 88, and the blocks of moss 88 are slidably displaced along the inside of the basket 16 in such a way as to fill the whole length of the basket 16. The basket 16 can be made by extrusion of different materials, such as plastic or aluminium, in longitudinal lengths that are cut to the desired length capable of fitting inside and perpendicular to the rims 14 of the drum 12 of the apparatus 10. Certain areas of the side walls of such extruded elongated baskets can be thinner than the remaining portions of the side walls so that with gentle pressure, one or both side walls of each basket, may be pulled outwardly to widen the gap 68 and so allow for a top insertion of each plant P in its respective block of moss 88, that is for the plants P to be introduced between the upper walls 66 and into the baskets 16.

The baskets 16 can be made of sturdy metal mesh bent to size, and reinforced, if necessary, with metal plates, The side walls can also be made of a metal frame with mesh incorporated therewith. Whether the elongated basket 16 is made of extruded aluminium or of individual walls attached one to the other, one side wail can be (hingedly) connected to the bottom wall with hinges so that it can open almost 90° to allow for the plants P to be inserted sideways in their blocks of moss 88 instead of by way of longitudinal sliding insertion.

The lighting system 120, which rests in the arcuate upper members or cradles 33 of the lamp support posts 32, includes of a pair of lights 92, or more depending on the length of the drum 12), which extend towards each other from opposed ends of the lighting system 120 and inside a translucent glass tube 96. More lights can be used depending on the length and diameter of the apparatus 10. Each of the lights 92 is capable of sliding inside the translucent tube 96 to a selected position where there is a distance such between the lights 92 that the ends of the light beams emanating from such lights 92 do meet near the inside surface of all of the elongated baskets 16 around the drum 12. In this fashion, one maximises the homogeneous exposure to light on the whole area inside the drum 12. A ventilation system (not shown) comprising fans and ducts 98, or the like, is connected to each of the caps 98 closing the opposite ends of the translucent tube 96.

The watering or feeding station 100 comprises a rectangular storage tank 102 of such width, length and height that it fits under the base frame 22 of the support stand 20. The watering or feeding station 100 also includes a removable upper feeding tray 104, preferably concave and of a radius complementary with the radius of the drum 12 carrying the elongated baskets 16 thereon. A pump (not shown), located inside the tank 102, will through a tube (not shown) fill the concave tray 104 with nutrient fluid F through fluid entrance hole (not shown), The level of nutrient fluid F in the concave tray 104 is controlled by two adjustable overflow tubes 112 that drain excess nutrient fluid F to drain into the tank 102 at 106. Therefore, the nutrient fluid F is always provided when needed by the pump into the tray 104 and the excess is captured by the overflow tubes 112 and returned to the tank 102 underneath.

Depending on the nature of the plants that are grown, it may not be desirable that the plants at every rotation of the drum 12 come in contact with the nutrient fluid F. Many types of cultures will require a period without contact of the plants P with the nutrient fluid F. As it is preferable that the roots of such plants dry between watering with the nutrient fluid P, the speed of rotation of the drum 12 (e.g. 55 minutes per rotation thereof) is adjusted based on a series of factors, such as the ambient temperature, the type of growing medium (e.g. moss 88, glass beads, etc.), the humidity, ventilation, etc.

Accordingly, to provide this period of non contact with the nutrient fluid F for these types of cultures, the apparatus 10 has a level control valve (not shown) that will prevent the nutrient fluid F from being fed into the concave tray 104 by the pump and will instead recirculate the nutrient fluid F in the tank 102 to always insure movement therein and thereby prevent stagnation with undesired result such as certain salts, particles or elements precipitating at the bottom. A timing device (not shown) can be associated with the control valve to predetermine the phases of contact or absence of contact of the plants P with the nutrient fluid F. Alternatively to preventing nutrient fluid from being fed to the concave tray 104, the moveable frame 24 may be elevated to its position in FIG. 4 thereby spacing the baskets 16 from the nutrient fluid F contained in the tray 104. In such a case, the raising and lowering of the moveable frame 24 can be motorised device (e.g. via one or more pneumatic or hydraulic cylinders, not shown) that is actuated by a timing device.

FIGS. 5 to 15 are exploded perspective views of part of a number of variants of the drum 12 of the rotary plant growing apparatus of FIGS. 1 to 4. More particularly, various attachment systems are proposed to removably mount the elongated baskets 16 to the rims 14 of the drum 12.

Figure 5:
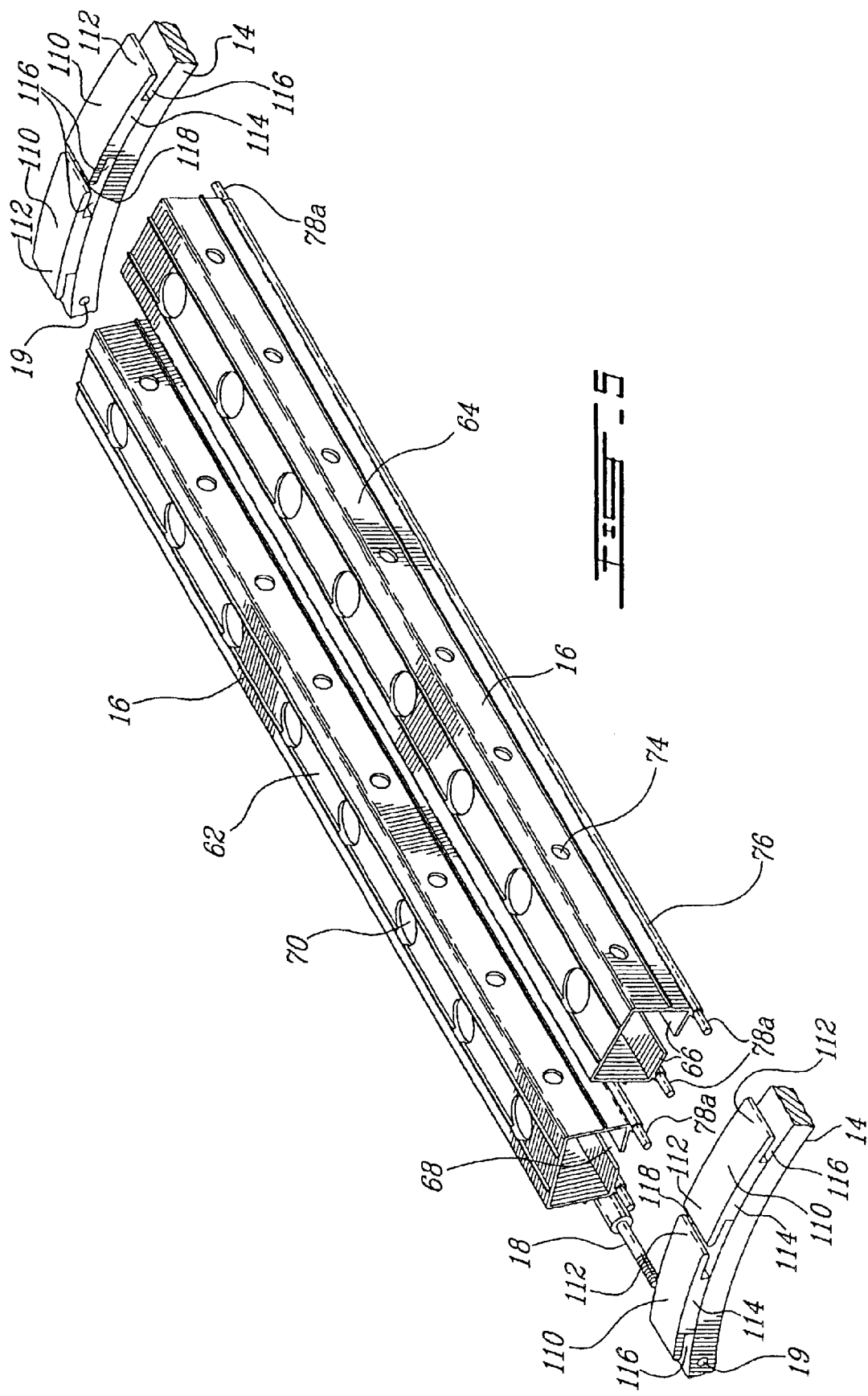

In FIGS. 1 to 4, the resilient attachment pins 78, which are engageable in the holes no defined on the inside walls of each of the rims 14, are used to secure the elongated baskets 16 between the rims 14 of the drum 12. In FIG. 5, the pins 78 are replaced by rigid pins 78a. Each rim 14 is provided on an outside periphery thereof with a number of slightly spaced apart T-shaped members 110 having two arms 112 and a base 114. Each T-shaped member 110 defines a recess 116 between each of the arms 112 and the outside surface of the rim 14. As the basket 16 is somewhat resilient, its upper walls 66 can be forcibly spread to enlarge the gap 68 and allow the pins 78a to be engaged through spaces 118 defined between adjacent T-shaped members 110. The basket is then released and the pins 78a spring back towards one another into the recesses 116 and thus securely behind the arms 112 of the T-shaped member 110.

Figure 6:
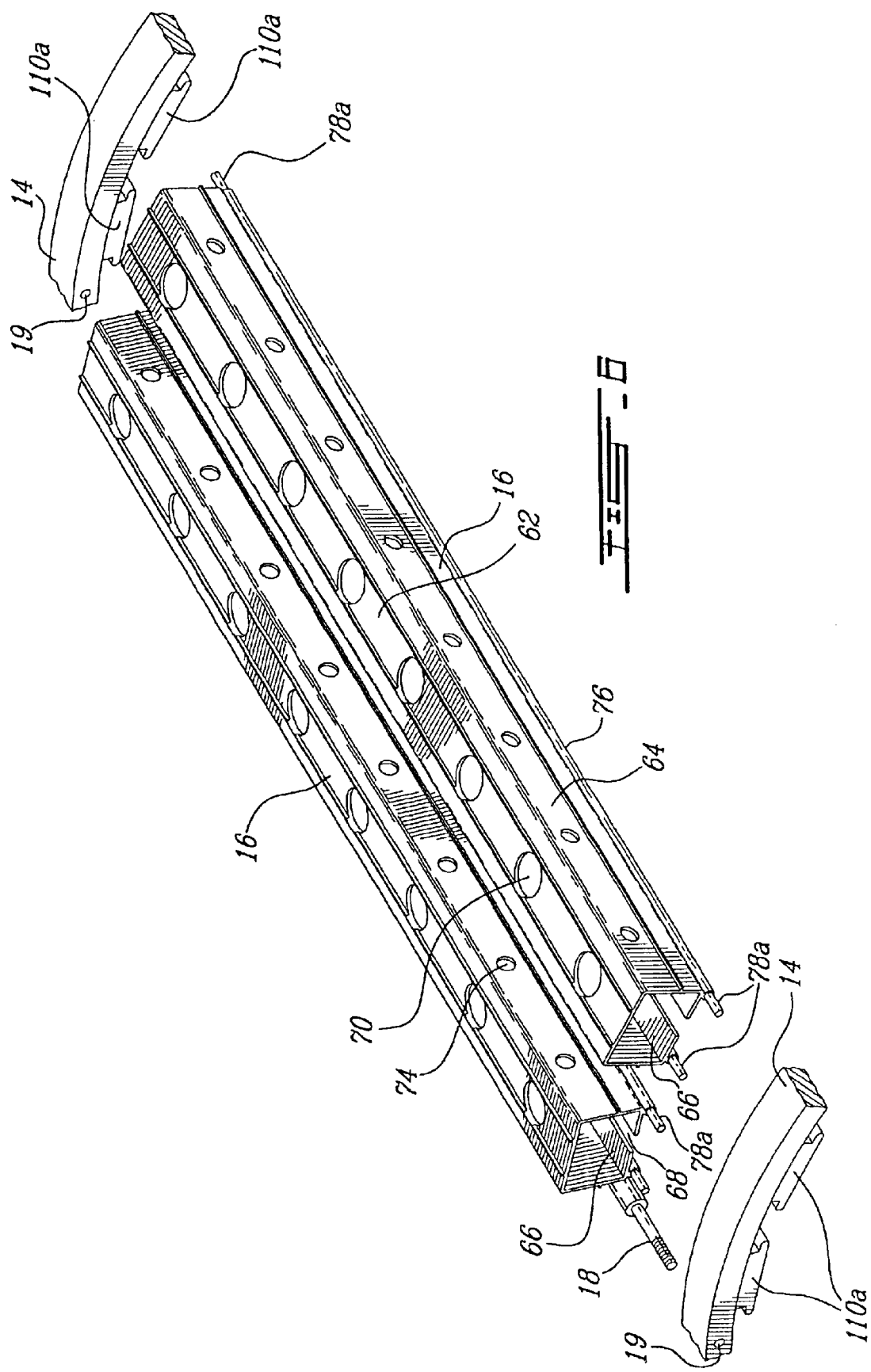

In FIG. 6, the T-shaped members 110 of FIG. 5 are replaced by T-shaped members 110a located on the inside surface of the rims 14 of the drum 12.

Figure 7:
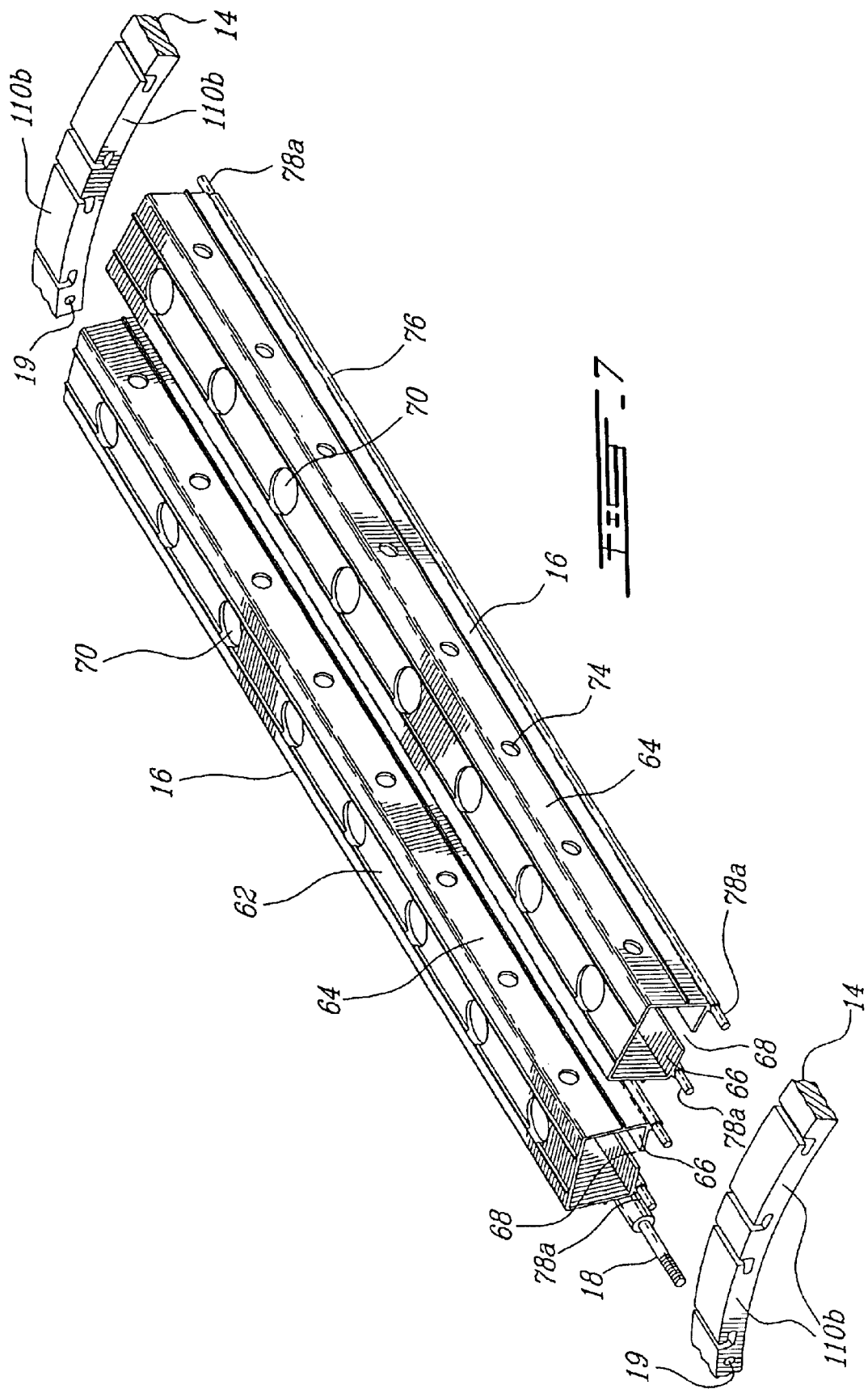

In FIG. 7, the T-shaped members 110 of FIG. 5 are replaced by T-shaped members 110b defined directly in the outside surfaces of the rims 14 of the drum 12.

Figure 8:
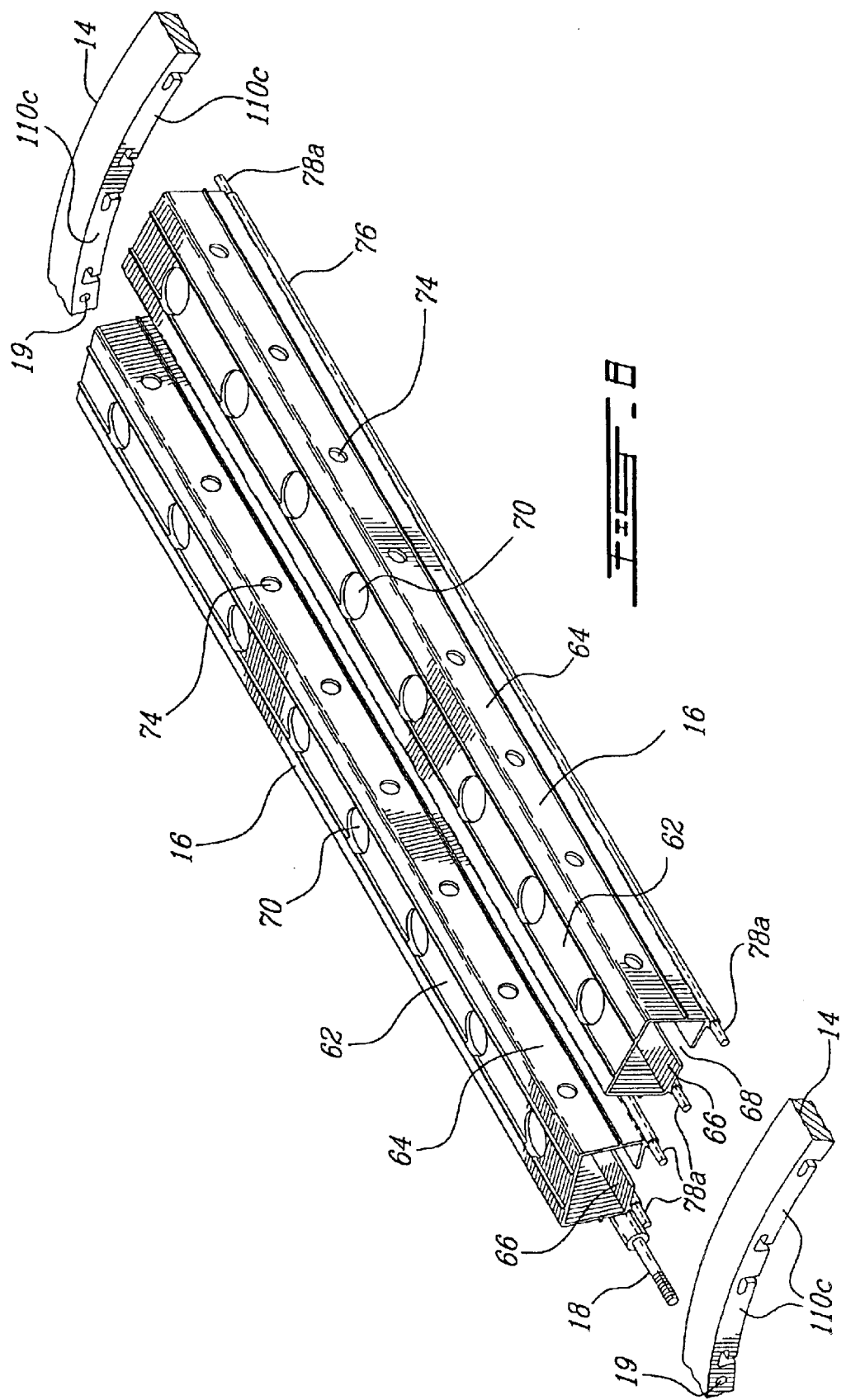

In FIG. 8, the T-shaped members 110b of FIG. 7 are replaced by T-shaped members 110c defined directly in the inside surfaces of the rims 14 of the drum 12.

Figure 9:
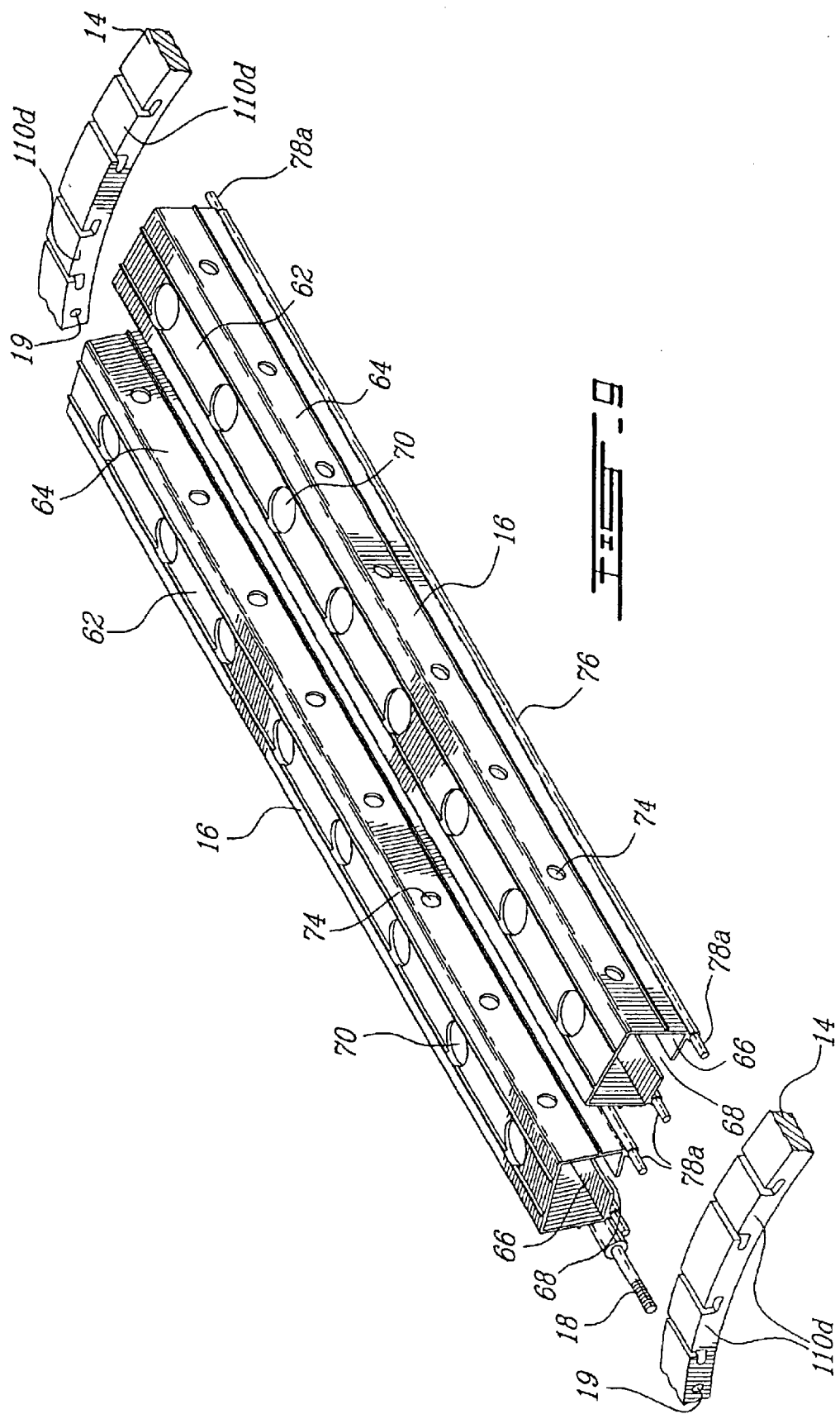

In FIG. 9, the T-shaped members 110k of FIG. 7 are replaced by T-shaped members hod in which the recesses 116d extend in opposed directions such that the basket 16 needs to be compressed so as to bring its pins 78a closer together until they have been engaged through the spaces 118d, at which point releasing the basket 16 causes its pins 78a to spring outwardly along the recesses 11d and behind the arms 112d.

Figure 10:
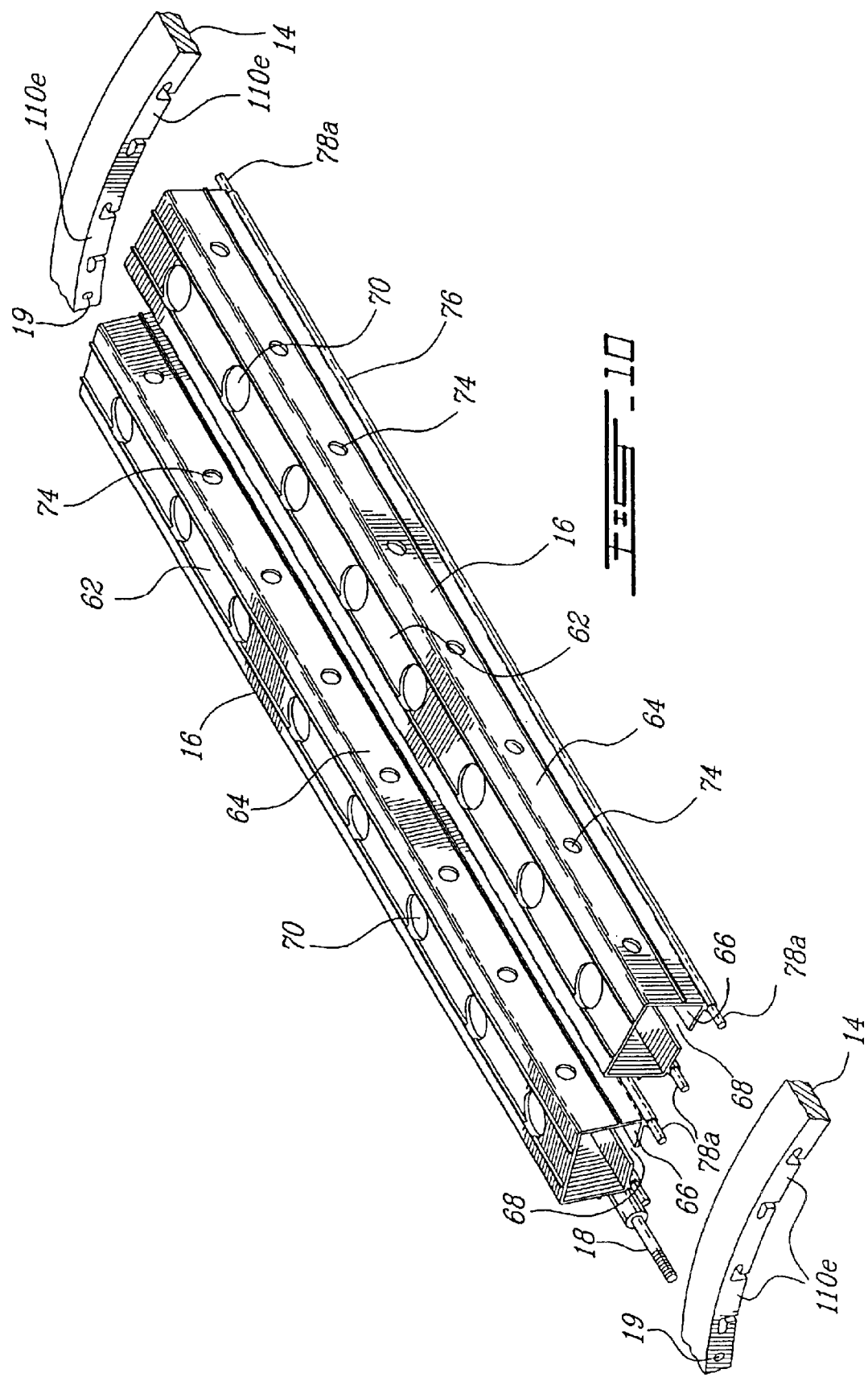

FIG. 10 illustrates T-shaped members hoe similar to the T-shaped members 110d of FIG. 9, but wherein the recesses 116e are defined, as in FIG. 8, on the inside surfaces of the rims 14 of the drum 12. As in FIG. 9, the basket 16 needs to be compressed to mount it to the rims 14, In FIG. 11, L-shaped recesses 120 are defined in the outside surfaces of the rims 14 of the drum 12, but as opposed to the recesses of FIGS. 5 to 10, the recesses 120 extend in a same direction, such that the pins 78a of the basket 16 are simply slid through into the radial portions of the recesses 120, i.e. without having to spread or compress the basket 16, and are then slid along the circumferential portions of the recesses 120. The pins 78a are then locked into the recesses 120 using a bracket 122 that closes off the radial portion of the recess 120 thereby preventing the pins 78a from escaping therefrom. The bracket can be a rectangular loop surrounding the rim 14 and slidable circumferentially therealong so as to cover or not the recesses 120.

Figure 11:
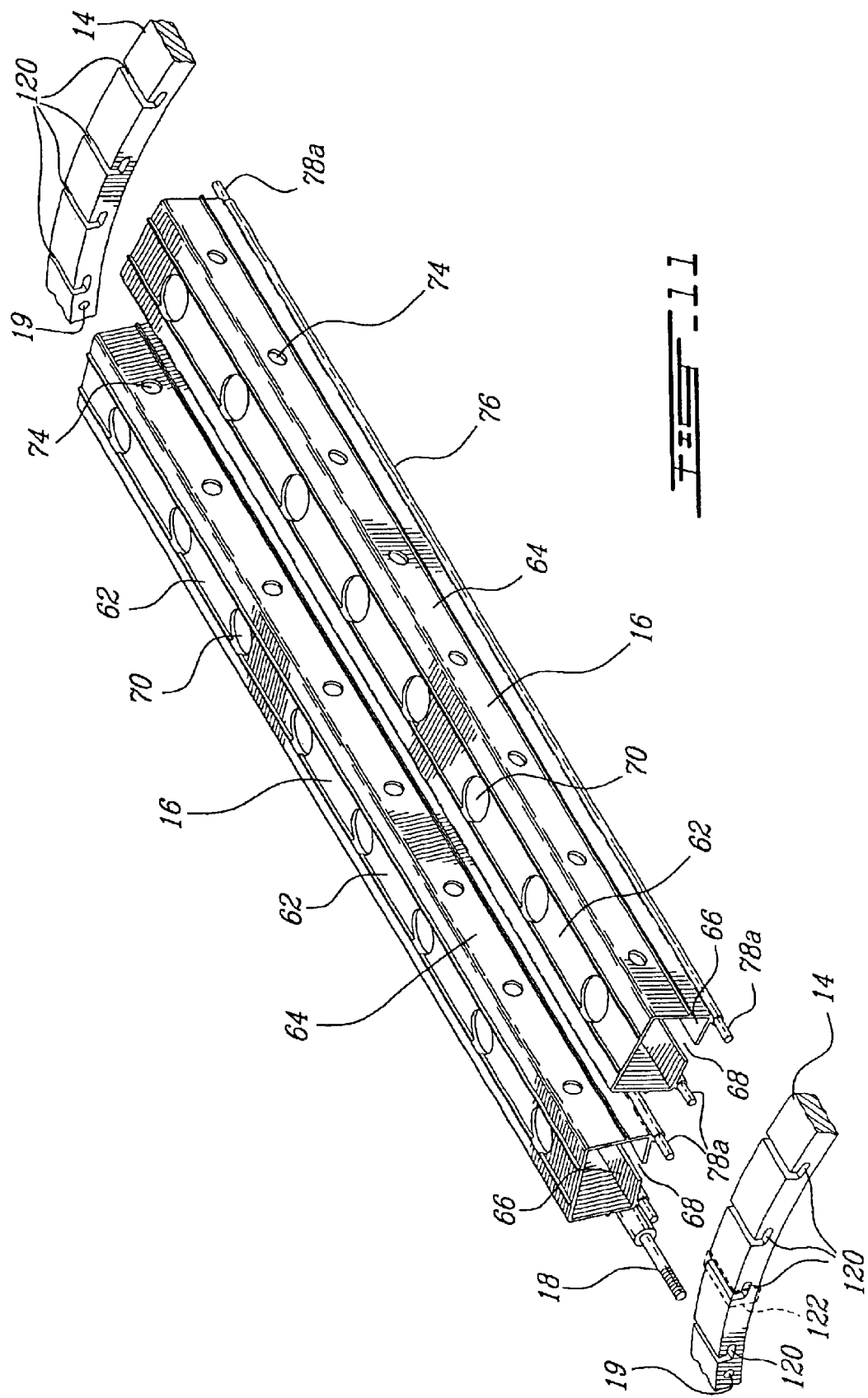
Figure 12:
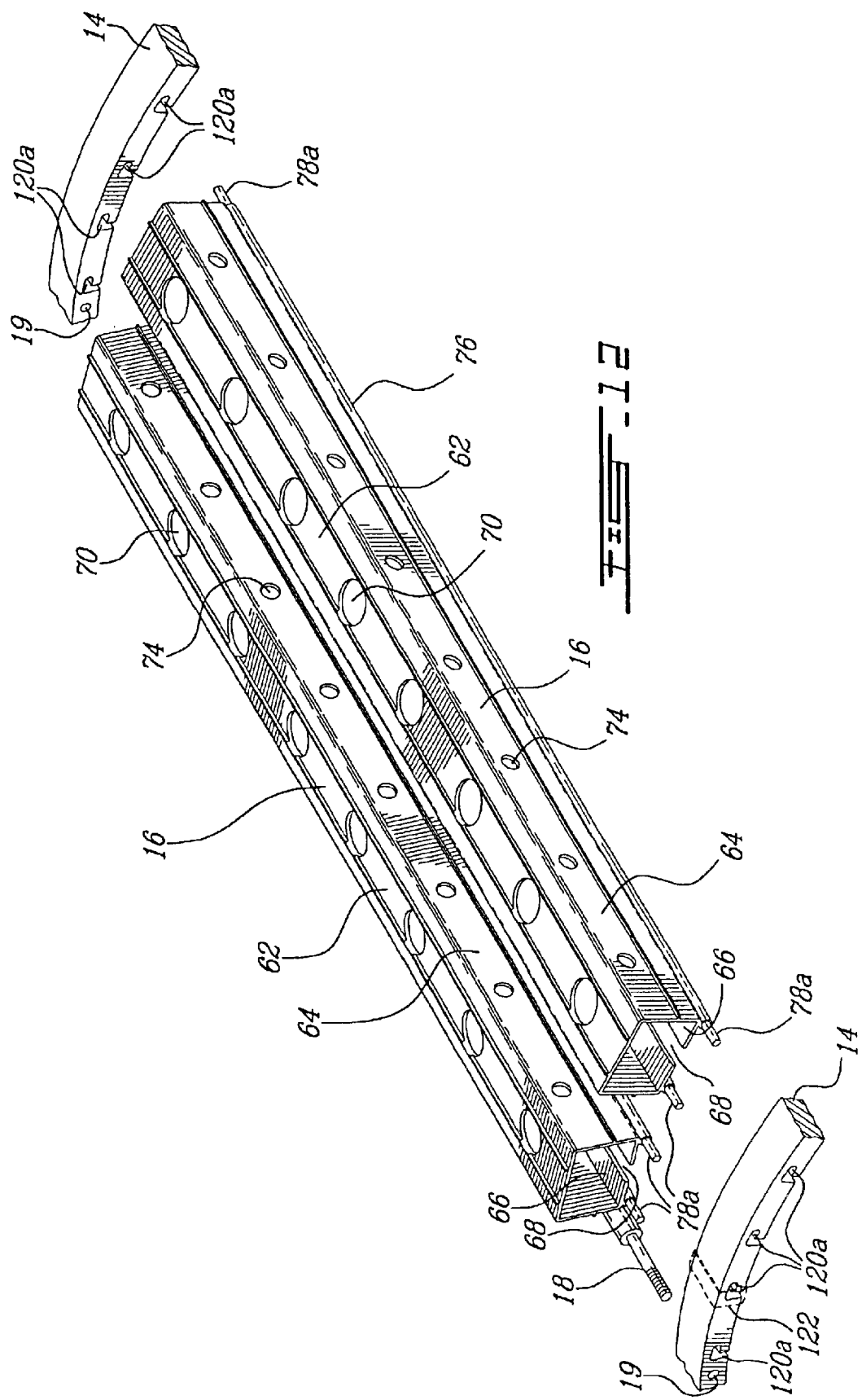

FIG. 12 illustrates L-shaped recesses 120a similar to the L-Shaped recesses 120 FIG. 11, but wherein the recesses 120a are defined on the inside surfaces of the rims 14 of the drum 12.

Figure 13:
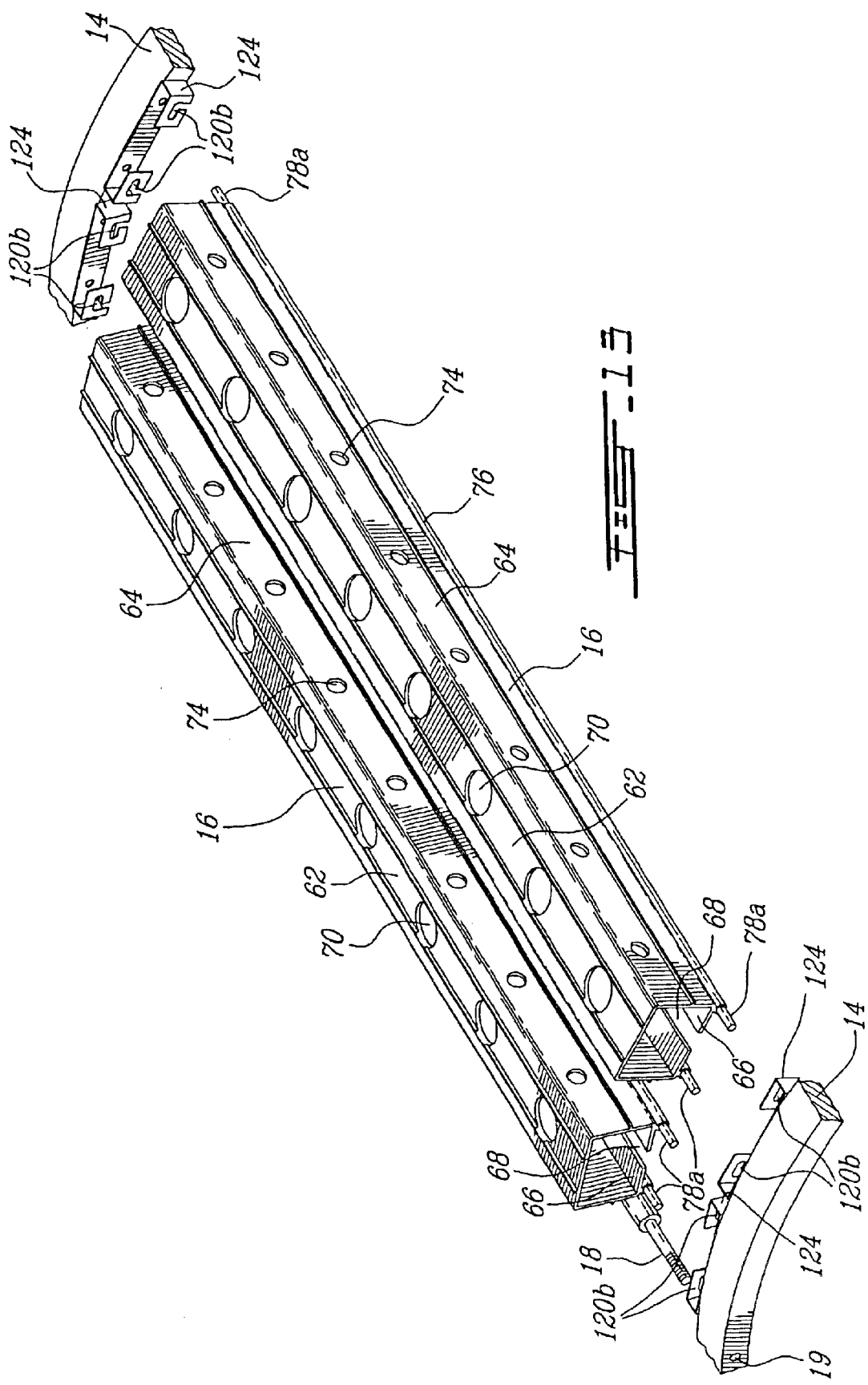

FIG. 13 is similar to FIG. 8, except that brackets 124 are mounted on the rims 14, the brackets 124 defining L-shaped recesses 120b that can be engaged by the pins 78a by first spreading the basket 16. The brackets 124 and their recesses 120b could be modified so that the basket 16 needs to be compressed (as in Pigs. 9 and 10).

Figure 14:
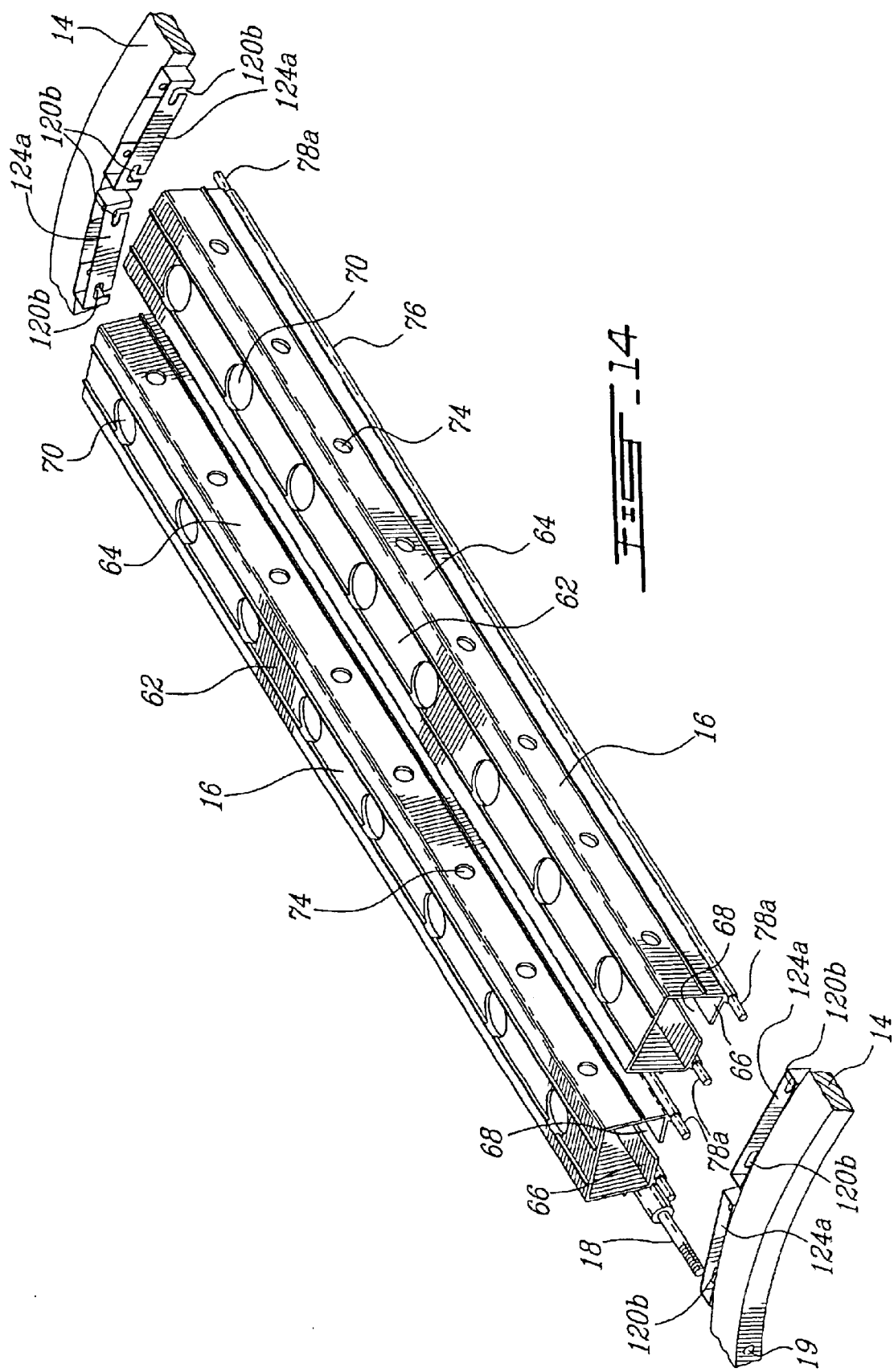

FIG. 14 illustrates a variant 124a of the bracket 124 of FIG. 13.

FIG. 15 shows an annular plate 126 which defines L-shaped recesses 120c, there being one annular plate 126 per rim 14, as opposed to the brackets 124 or 124a of FIGS. 13 and 14 that each are dedicated to attaching the end of a single basket 16 to the rim 14.

It is noted that for each drum variant where the pins 78a are rigid (i.e. in the variants of FIGS. 5 to 15, as oppose to the pins 78 of FIGS. 1 to 4 that are resilient), the pins 78a can be integral with the hollow tubular members 76, which themselves do not need to be hollow. In tact each member 76 and its two pins 78a can be embodied in a unitary rod or pin, that is solid or hollow.

The embodiment of the invention in which an exclusive property or privilege is claimed are defined as follows:

1. A rotary plant growing apparatus comprising:
    a cylindrical structure;
    a support base for said cylindrical structure;
    drive means to rotate said cylindrical structure on said support base about a rotational axis of said cylindrical structure;
    at least one light source inside said cylindrical structure about which said cylindrical structure can rotate;
    a nutrient fluid source for growing plants as said cylindrical structure rotates;
    the improvement wherein said cylindrical structure comprises at least one removable elongated basket including a coextensive wall being capable of receiving and retaining therein a series of plants supported by a growing medium, and attachments for removably attaching said elongated basket to the cylindrical structure whereby the plants in the basket can be readily accessed for maintenance.

2. An apparatus according to claim 1, wherein the cylindrical structure includes circular rims axially spaced apart of the cylindrical structure and the attachments removably attach each elongated basket to the rims.

3. An apparatus as defined in claim 2, wherein the rims include a pair of rims, one at each end of the cylindrical structure and the attachments removably attach the ends of each basket to a respective rim.

4. An apparatus according to claim 2, wherein the attachments comprise pins extending axially outwardly from upper portions of the wall of both ends of the elongated basket and associated L-shaped slots defined in each rim such that said elongated baskets, when attached by the attachments, extend between the rims.

5. An apparatus as defined in claim 4, wherein each rim includes mounting brackets on which the L-shaped slots are defined.

6. An apparatus as defined in claim 4, wherein a circular band is provided on each rim to close the L-shaped slots, once the baskets are attached.

7. An apparatus according to claim 2, wherein the rims are held in parallel attitude by a plurality, of longitudinal segments adapted to be affixed at opposite ends thereof to said rims.

8. An apparatus as defined in claim 2, wherein the attachments comprise pins extending axially outwardly from upper portions of the wall of both ends of the elongated basket whereby the upper portions of the baskets can flex to allow the pins to be resiliently moved and associated T-shaped members are located on the rims defining circumferentially, oppositely extending slots for receiving and retaining respective pins.

9. An apparatus as defined in claim 8, wherein the T-shaped member is located on the radially inward surface of the respective rims.

10. An apparatus as defined in claim 8, wherein the T-shaped member is located on the radially outward surface of the respective rims.

11. An apparatus as defined in claim 8, wherein the slots are defined in a bracket mounted to the axially inward side of the rims.

12. An apparatus according to claim 2, wherein the attachment comprises resiliently biased pins extending outwardly from and in substantial alignment with upper ends of the wall of both ends of the elongated basket and associated holes defined in each rim such that said elongated baskets, when attached by the attachments, extend between the rims.

13. An apparatus according to claim 1, wherein the attachments retain the elongated baskets against rotation relative to the cylindrical structure with the plants exposed to the light source.

14. An apparatus as defined in claim 1, wherein the elongated basket has a rectangular cross-section with the wall having a bottom and side wall and top wall portions.

15. An apparatus as defined in claim 1, wherein the nutrient fluid source includes a nutrient bath container adjacent the cylindrical structure and the wall of the elongated basket includes apertures therein such that, when the cylindrical structure is rotated, the elongated basket passes through the nutrient fluid bath.

16. An apparatus as defined in claim 15, wherein the nutrient bath container is associated with the support base such that a submersible portion of the cylindrical structure defined by a chord thereof coincides with the nutrient bath container.

17. An apparatus as defined in claim 16, wherein the base includes a movable frame which can be operated to elevate said submersible portion of the cylindrical structure from the nutrient bath container such that the elongated baskets will not pass through the nutrient bath.

* * * * *